US010089681B2

(12) United States Patent
Ramos et al.

(10) Patent No.: US 10,089,681 B2
(45) Date of Patent: Oct. 2, 2018

(54) AUGMENTED REALITY COMMERCIAL PLATFORM AND METHOD

(71) Applicant: 3View Holdings, LLC, Salt Lake City, UT (US)

(72) Inventors: Miguel D. Ramos, Salt Lake City, UT (US); Mark T. Polson, Salt Lake City, UT (US)

(73) Assignee: Nimbus Visulization, Inc., Salt Lake City, UT (US)

( * ) Notice: Subject to any disclaimer, the term of this patent is extended or adjusted under 35 U.S.C. 154(b) by 0 days.

(21) Appl. No.: 14/960,133

(22) Filed: Dec. 4, 2015

(65) Prior Publication Data
US 2017/0161824 A1    Jun. 8, 2017

(51) Int. Cl.
*G06Q 30/00* (2012.01)
*G06Q 30/06* (2012.01)
*G06T 19/00* (2011.01)

(52) U.S. Cl.
CPC ........ *G06Q 30/0643* (2013.01); *G06Q 30/06* (2013.01); *G06Q 30/0601* (2013.01); *G06Q 30/0611* (2013.01); *G06Q 30/0619* (2013.01); *G06Q 30/0621* (2013.01); *G06Q 30/0641* (2013.01); *G06T 19/006* (2013.01)

(58) Field of Classification Search
CPC ............ G06Q 30/0601–30/0645; G06Q 30/08
USPC ................................. 705/26.1–27.2
See application file for complete search history.

(56) References Cited

U.S. PATENT DOCUMENTS

| 7,079,139 B2 | 7/2006 | Smith |
| 8,117,558 B2 | 2/2012 | Hoguet |
| 8,606,645 B1 | 12/2013 | Applefeld |
| 8,606,657 B2 | 12/2013 | Chesnut |
| 8,878,846 B1 | 11/2014 | Francis, Jr. et al. |
| 8,982,110 B2 | 3/2015 | Saban et al. |
| 2002/0010655 A1 | 1/2002 | Kjallstrom |
| 2003/0097313 A1 | 5/2003 | Saul |
| 2003/0179218 A1 | 9/2003 | Martins |
| 2004/0167796 A1* | 8/2004 | Lynch ............... G06Q 30/06 705/301 |
| 2004/0239670 A1 | 12/2004 | Marks |

(Continued)

FOREIGN PATENT DOCUMENTS

| DE | 10301849 A1 | 8/2004 |
| DE | 102005048926 A1 | 7/2006 |

(Continued)

OTHER PUBLICATIONS

Khaw, Cassandra, "Meet the item creators: pro and self-taught artists making millions from Dota 2", Jun. 29, 2013, PC Gamer. accessed at [https://www.pcgamer.com/dnp-meet-the-dota-2-item-creators/], accessed on [May 15, 2018].*

*Primary Examiner* — Resha Desai
*Assistant Examiner* — Lindsey B Smith
(74) *Attorney, Agent, or Firm* — Perry S. Clegg; Kunzler, PC

(57) ABSTRACT

An augmented reality commercial platform is provided to simulate a product in an environment. The augmented reality commercial platform may include a merchant component, consumer component, augmentation engine, illustrator component, and monetization component. A method to simulate a product in an environment using the augmented reality commercial platform is also provided.

19 Claims, 7 Drawing Sheets

(56) References Cited

U.S. PATENT DOCUMENTS

| | | |
|---|---|---|
| 2008/0004952 A1* | 1/2008 | Koli ................... G06O 30/02 |
| | | 705/14.55 |
| 2008/0071559 A1* | 3/2008 | Arrasvuori ............ G06Q 30/06 |
| | | 705/26.1 |
| 2009/0109240 A1 | 4/2009 | Englert |
| 2010/0053151 A1 | 3/2010 | Marti |
| 2010/0185529 A1 | 7/2010 | Chesnut |
| 2010/0208057 A1 | 8/2010 | Meier |
| 2010/0287511 A1 | 11/2010 | Meier |
| 2010/0289817 A1 | 11/2010 | Meier |
| 2011/0161182 A1* | 6/2011 | Racco ............... G06Q 30/0277 |
| | | 705/14.73 |
| 2012/0116914 A1 | 5/2012 | Stinson |
| 2012/0215663 A1 | 8/2012 | Coene |
| 2012/0259743 A1 | 10/2012 | Pate, Jr. |
| 2012/0268490 A1 | 10/2012 | Sugden |
| 2012/0271738 A1 | 10/2012 | Narcisse |
| 2013/0066746 A1 | 3/2013 | O'Hara |
| 2013/0187905 A1 | 7/2013 | Vaddadi |
| 2014/0002442 A1 | 1/2014 | Lamb |
| 2014/0002444 A1 | 1/2014 | Bennett |
| 2014/0002498 A1 | 1/2014 | Lee et al. |
| 2014/0100997 A1 | 4/2014 | Mayerle |
| 2014/0125668 A1 | 5/2014 | Steed |
| 2014/0132595 A1* | 5/2014 | Boulanger ............ G06T 19/20 |
| | | 345/419 |
| 2014/0232715 A1 | 8/2014 | Nigam |
| 2014/0253553 A1 | 9/2014 | Jovanovie |
| 2014/0282220 A1 | 9/2014 | Wantland |
| 2014/0285522 A1 | 9/2014 | Kim et al. |
| 2014/0306993 A1 | 10/2014 | Poulos |
| 2014/0313203 A1 | 10/2014 | Shugart |
| 2014/0253589 A1 | 11/2014 | Tout |
| 2015/0097862 A1 | 4/2015 | Reisner-Kollmann et al. |
| 2015/0103098 A1 | 4/2015 | Sugden |
| 2015/0170260 A1 | 6/2015 | Lees |

FOREIGN PATENT DOCUMENTS

| | | |
|---|---|---|
| EP | 2816520 A1 | 12/2014 |
| GB | 2494697 A | 3/2013 |
| GB | 2523032 A | 8/2015 |
| WO | 2014204393 A1 | 12/2014 |

* cited by examiner

AUGMENTED REALITY COMMERCIAL PLATFORM AND METHOD

FIELD OF THE INVENTION

The present invention relates to shopping. More particularly, the invention relates to simulation of a product in an environment to facilitate shopping.

BACKGROUND

Consumers have been shopping for goods and products to place in their homes or other environments for most of modern times. Typically, such a process would involve traveling to a store, selecting a product for the home or environment, and transporting a purchased product from the store to the home. After bringing the product home, the consumer must make sure that the product fits within its environment. For example, the consumer typically must ensure that the product fits in an environment both physically and also aesthetically with the decor of an environment. The physical aspect of this problem is especially prevalent with large or unwieldy products, such as couches, televisions, desks, and other large items. Fitting aesthetically is especially problematic with art, furniture, and other items visible in an environment. Products that do not fit, whether physically or aesthetically, must be physically returned to the store at which it was purchased, necessitating numerous trips at the inconvenience of the consumer.

With the advent of online shopping, some of the inconvenient aspects of the traditional shopping model have changed. For example, consumers may now select goods and products to place in their homes or environments using a computer or other electronic device. The consumer may order the product and have it delivered to his or her house, avoiding a trip to a brick-and-mortar store. However, the consumer must still deal with an uncertainty of whether a product will fit physically or aesthetically within his or her home or environment. Additionally, the online consumer cannot generally return the product to a physical store. Therefore, the online consumer must schedule pickup of the product to be returned by a postal or carrier service, often at the expense of the unsatisfied consumer.

Using the sale of furniture online as an example, a shopper purchasing a piece of furniture online can attempt to visualize the item in an intended environment. However, using traditional shopping techniques, the environment he or she would like to place the item in may not properly accommodate the piece of furniture. Traditional shopping techniques do not allow a consumer to test an item to determine whether the size, color, and other features work in the desired space and with the surrounding decor, thereby requiring a somewhat blind purchasing decision. To some extent, these uncertainties can dissuade shoppers from purchasing online because the likelihood of costly returns becomes a risk when a purchaser determines that the item does not fit in or otherwise complement the intended space.

Therefore, a need exists to solve the deficiencies present in the prior art. What is needed is a commercial platform that allows a consumer to visualize a product within an intended environment without being required to physically locate the product in that environment. What is needed is a commercial platform for connecting consumers, merchants, artists, and manufacturers to facilitate a transaction. What is needed is a simplified platform to shop for products that can be located in an environment. What is needed is a commercial platform capable of associating a product with a model for simulation in an environment. What is needed is a commercial platform with a consumer component to augment a simulated product in an environment. What is needed is a commercial platform with a marketplace for contracting illustration projects.

SUMMARY

An aspect of the invention advantageously provides a commercial platform for connecting consumers, merchants, and manufacturers to facilitate a transaction. An aspect of the invention advantageously provides a commercial platform that allows a consumer to visualize a product within an intended environment without being required to physically locate the product in that environment. An aspect of the invention advantageously provides a simplified platform to shop for products that can be located in an environment. An aspect of the invention advantageously provides a commercial platform capable of associating a product with a model for simulation in an environment. An aspect of the invention advantageously provides a commercial platform with a consumer component to augment a simulated product in an environment. An aspect of the invention advantageously provides a commercial platform with a marketplace for contracting illustration projects.

Accordingly, the disclosure may feature a commercial platform that includes a database, merchant component, and a consumer component. The database may be accessible via a computerized device with a processor and memory. The database may include a library of models, information relating to products, and an association of a model from the library of models with at least one of the products. The merchant component may be used to define the information and define the association of the at least one of the products with the model. The consumer component may be operable on the computerized device. The model may be selectable to augment with a substantially live representation of an environment. The model may be selected by indicating the at least one of the products associated with the model. The model may be accessed from the database to be augmented with the substantially live representation of the environment, relative to a target located in the environment. At least one model from the library of models may include permissions to selectively associate the at least one model with multiple merchants. The consumer component may include an augmentation engine to detect the target and display the model associated with the at least one of the products that is selected as being augmented in the substantially live representation of the environment relative to the target. The model may be displayed with a size being determined relative to dimensions of the target. The target may provide a reference point to augment the model with the substantially live representation of the environment.

In another aspect, the commercial platform may further include an illustrator component to facilitate contracting of illustrators for generation of at least one model includable in the library of models.

In another aspect, the commercial platform may further include a monetization component to determine a compensation relative to a usage of the commercial platform. The monetization component may generate the compensation relative to interaction with the merchant component and the consumer component.

In another aspect, the substantially live representation of the environment may include an at least partially transparent display through which at least part of the environment is viewable.

In another aspect, the substantially live representation of the environment may include a video feed.

In another aspect, the video feed may be created using a camera. The video feed may be relayed to a display.

In another aspect, the video feed may include multiple video inputs created using cameras. A depth factor may be approximated relative to the multiple video inputs. The depth factor may be used to approximate a three-dimensional space.

In another aspect, the products may be selected via the consumer component to create a queue of models to be selectively displayed with the substantially live representation of the environment.

In another aspect, the model may include a three-dimensional rendering that approximates a corresponding physical product.

In another aspect, the consumer component may be operable via an application program interface.

In another aspect, the merchant component may be manipulable via a merchant desiring to sell the at least one of the products and wherein the consumer component may be manipulable via a consumer considering to purchase the at least one of the products being sold by the merchant.

According to an embodiment of this disclosure, a commercial platform is provided that includes a database, merchant component, consumer component, and illustrator component. The database may be accessible via a computerized device with a processor and memory. The database may include a library of models, information relating to products, and an association of a model from the library of models with at least one of the products. The merchant component may be used to define the information and define the association. The consumer component may be operable on the computerized device to select the model to augment with a substantially live representation of an environment. The model may be selected by indicating the at least one of the products associated with the model. The model may be accessed from the database to be augmented with the substantially live representation of the environment. The illustrator component may facilitate contracting of illustrators for generation of at least one model includable in the library of models. The substantially live representation of the environment may include a video feed created using a camera and relayed to a display. The model may include a three-dimensional rendering that approximates a corresponding physical product.

In another aspect, the model may be augmented with the substantially live representation of the environment relative to a target located in the environment. The target may provide a reference point to augment the model with the substantially live representation of the environment. The consumer component may further include an augmentation engine to detect the target and display the model of the product augmented in the substantially live representation of the environment relative to the target.

In another aspect, the commercial platform may further include a monetization component to determine a compensation relative to a usage of the commercial platform. The monetization component may generate the compensation relative to interaction with the merchant component, the consumer component, and the illustrator component.

In another aspect, the video feed may include multiple video inputs created using cameras. A depth factor may be approximated relative to the multiple video inputs used to approximate a three-dimensional space.

In another aspect, the products may be selected via the consumer component to create a queue of models to be selectively displayed with the substantially live representation of the environment.

In another aspect, the consumer component may be operable via an application program interface to be at least partially integrated into a commercial website.

According to an embodiment of this disclosure, a method is provided for conducting commerce via a commercial platform operable using a computerized device with a processor and memory. The method may include accessing a database via the computerized device. The database may include a library of models, information relating to products, and an association of a model from the library of models with at least one of the products. The method may also include defining the information via a merchant component. Additionally, the method may include defining the association of the at least one of the products with the model via the merchant component. The method may include selecting the model to augment with a substantially live representation of an environment via a consumer component operable on the computerized device. The consumer component may perform additional steps, including receiving an indication of the at least one of the products associated with the model, accessing the model from the database, locating a target in the environment, and augmenting the model with the substantially live representation of the environment relative to the target. The consumer component may include an augmentation engine to detect the target and display the model associated with the at least one of the products that is selected. The model may be displayed with a size being determined relative to dimensions of the target. The target may provide a reference point to augment the model with the substantially live representation of the environment. The merchant component may be manipulable via a merchant desiring to sell the at least one of the products and wherein the consumer component may be manipulable via a consumer considering to purchase the at least one of the products being sold by the merchant.

In another aspect, the method of claim may include the step of contracting at least one illustrator via an illustrator component to generate at least one model includable in the library of models.

In another aspect, the method may further include the steps of determining a compensation using a monetization component relative to a usage of the commercial platform, and generating the compensation relative to interaction with the merchant component and the consumer component.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
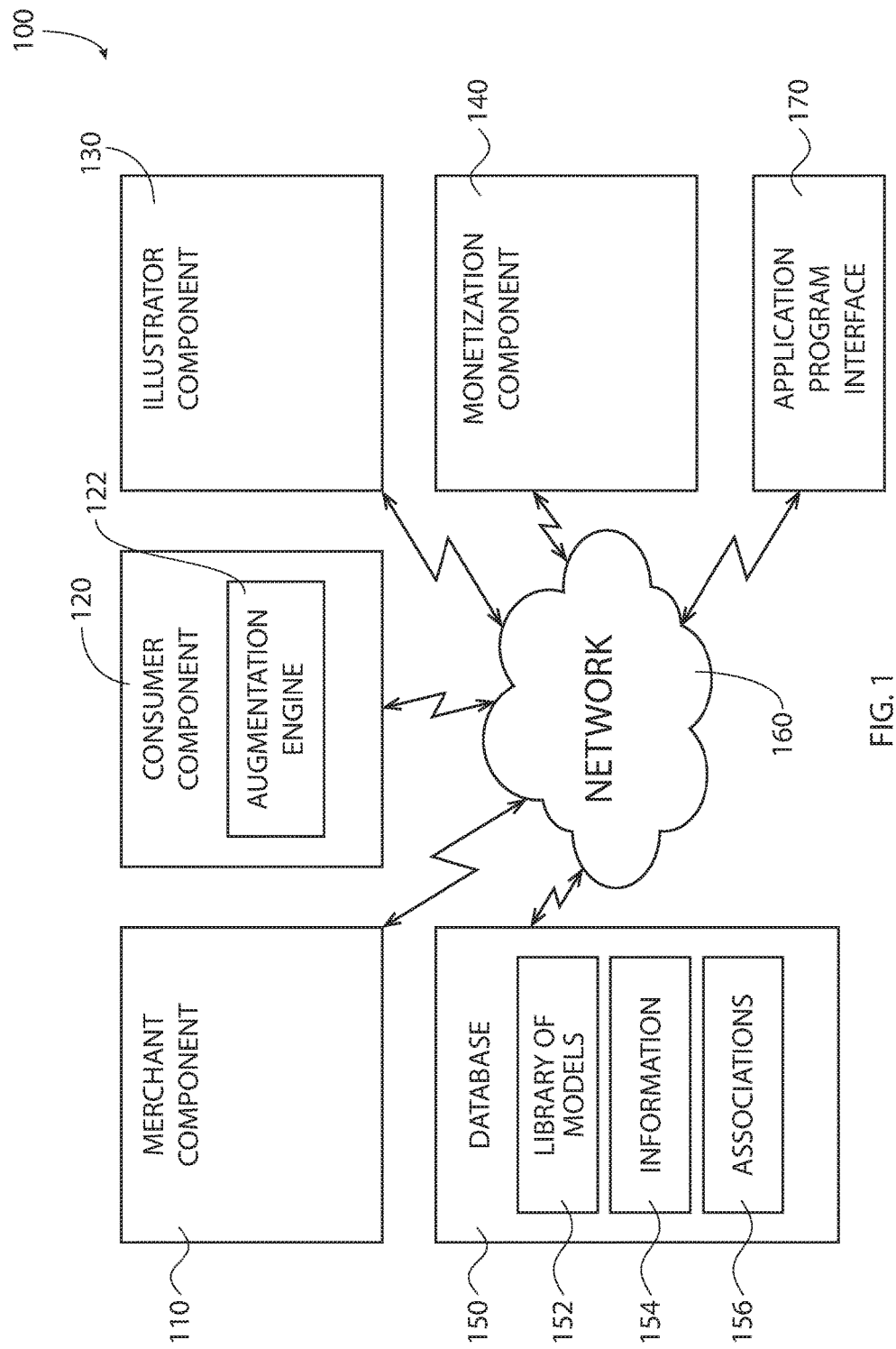
FIG. 1 is a block diagram view of an augmented reality commercial platform, according to an embodiment of this disclosure.

The following disclosure is provided to describe various embodiments of an augmented reality commercial platform. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present invention will now be described in detail, without limitation. In the following disclosure, an augmented reality commercial platform will be discussed. Those of skill in the art will appreciate alternative labeling of the augmented reality ("AR") commercial platform as an AR purchasing platform, AR commerce system, AR shopping application, AR shopping app, the invention, or other similar names. Similarly, those of skill in the art will appreciate alternative labeling of the augmented reality commercial platform as an AR shopping method, AR commercial transaction method, AR commerce management operation, method, operation, the invention, or other similar names. Skilled readers should not view the inclusion of any alternative labels as limiting in any way.

Referring now to FIGS. 1-7, the augmented reality commercial platform will be discussed in more detail. The augmented reality commercial platform 100 may include a merchant component 110, consumer component 120, augmentation engine 122, illustrator component 130, monetization component 140, database 150, and additional components that will be discussed in greater detail below. In some embodiments, the database 150 may include a library of models 152, information about products 154, and associations among products and models 156.

The components may be communicatively connected via a network 160. Optionally, the commercial platform may include an application program interface (API) 170, which may facilitate integration of the commercial platform 100 into other commercial systems. The augmented reality commercial platform 100 may operate one or more of these components interactively with other components to simulate a product in an environment. The commercial platform 100 may connect consumers, merchants, and manufactures to facilitate a commercial transaction. The monetization component 140 is optionally included to generate revenue, for example based on usage, as users interact with the commercial platform 100.

The merchant component 110 may be incorporated in a merchant's sales system, such as via an API 170. The merchant component 110 may receive information 154 regarding a merchant's stock or inventory. The information 154 is storable in a database 150 hosted by the commercial platform 100. Products are associable with images or 3D models in the interface via an association 156, which may include an identifier, for example, a Unique Product Code (UPC) or Stock Keeping Unit (SKU) code. The monetization component 140 may collect a fee from merchants for database storage and/or access.

The merchant component 110 may include account and/or admin site portals, which may be provided to merchant or other users via a network accessible interface. Merchants, such as e-commerce vendors, that have integrated the commercial platform 100 into their online store may have an account with the merchant component 110 of the commercial platform 100, which may include access to an administrator site that lists the merchant's products and corresponding product information 154, for example, UPCs.

The consumer component 120 may facilitate virtualizing a product in an environment prior to purchase by a prospective consumer, advantageously increasing sales and decreasing returns for products physically or aesthetically incompatible with an environment. The consumer component 120 may include a stand-alone interface, webpage, or other interface medium. Virtualization may use augmented reality (AR) to render a substantially accurate 3D model of an object in a space allowing a consumer to determine compatibility with the space prior to purchase and shipment of the product. Alternatively, the virtualization may be an illustration or photograph of the product. The virtualization may optionally include an animation, video, sound, and/or other multimedia content. The monetization component 140 may collect a fee for each view of a model and/or commission for each sale through the consumer component 120.

A consumer may select a product via the consumer component 120 operating on a computerized device, such as a smartphone, tablet, or computer. A camera included by the computerized device may capture and display a substantially real-time video feed of the environment. A 3D model (or image) virtualization of a selected product may be rendered with the real-time feed via the application and displayed to the consumer, providing a virtual rendering of the product augmented in the environment in which the product may be located or installed. For example, a consumer may visualize an accurately sized and patterned couch in a living room setting before purchasing and shipping the furniture, eliminating the need for costly returns if the couch does not fit physically or aesthetically.

In one embodiment, a model of the product may be augmented in a substantially live representation of an environment using the consumer component 120, for example, and augmentation engine 122 of the consumer component 120. The virtualized product may be positioned in the environment respective to a target, for example, an asymmetrical target with an identifiable orientation. The target can be virtually any object analyzable via the consumer component 120 to determine orientation, with the product being augmented with an orientation respective to the target, as definable via information in the database 150. Augmented models may be moved about the space by moving the target. Alternatively, augmented models may be moved by interacting with the consumer component 120.

The consumer component 120 may operate in association with one or more commercial websites. A commercial website is where online shoppers may view and/or purchase products over a network. In some embodiments, the consumer may complete a purchase outside of the commercial platform, for example, at a physical store or car dealership, without limitation. When a commercial website uses the commercial platform 100 of this disclosure, there may be additional interface features, such as icons or user-selectable elements, which may allow the shopper to see an augmented model, hologram, 3D view, spec sheet, or other information of the selected product. If a model, for example, a three-dimensional model, exists in the library of models, then the model may be associated with the correct product on the commercial website through the an identifying piece of information, for example, the UPC.

The illustrator component 130 may facilitate interaction between merchants and illustrators to develop 3D models displayable via the consumer component 120. An illustrator may view a marketplace for modeling projects, accept the project for an agreed compensation from a merchant, and deliver the finished product model in exchange for payment. Models may additionally be provided by merchants. The monetization component 140 may retain part of the payment as revenue for the commercial platform 100. The illustrator component 130 may include a filter to facilitate sorting through available projects and selecting a project that an illustrator wishes to complete.

In one embodiment, illustrators and other contributors to the library of models may create new content, which may not include editing existing content. Illustrators and other contributors to the marketplace can get paid a lump sum and/or for how much their models, completed projects, and other works are used via the commercial platform. Payment to illustrators may be provided via the illustrator component 130, which may optionally operate in cooperation with the monetization component 140.

Illustrators and contributors may choose to add models and other content to the library of models 152 or other data includable in the database 150 for free. As an example, a manufacture may freely provide information and a model of its products for listing via the commercial platform 100 in hopes to increase sales. The rights may be defined in advance and nonnegotiable. In some embodiments, content can be created from multiple contributors in response to the same request and the requestor can choose the preferred contribution and only have to pay for the chosen contribution.

The monetization component 140 may generate revenue from the commercial platform 100 using various commercial models, including subscription, transaction, commission, and other commercial models. The commercial platform 100 may create a win-win ecosystem for all of the parties involved with enriching product visualization for commerce. The commercial platform 100 may automatically link the models in the library of models 152 to their corresponding product pages on a commercial website. The link may be provided to the commercial website via the API 170, for example, which may add interactive elements and new functionality to the existing commercial website. Online shoppers that go to the e-commerce stores and commercial website may find new buttons, icons, and/or interactive elements that allow the consumers to create holograms or otherwise augmented representations of the products they are considering to purchase. The consumer shopping experience will advantageously be improved because the consumers may see details of the products that they could never see from pictures alone. The monetization component 140 may charge manufacturers and/or merchants a subscription fee to have their products viewable via the commercial platform 100 of this disclosure. Alternatively, the monetization component 140 may charge a transaction fee each time a button or interactive element associated with the commercial platform 100 is clicked or a commission each time a product is purchased with the benefit of the commercial platform 100. In another embodiment, the monetization component 140 may generate revenue by charging and/or otherwise acquiring a set fee.

Illustrators, contributors, and other freelance artists can create accounts via the illustrator component 130 and make models for products, for example, via modeling project requests. The models the illustrators make may be added to the library of models 152. The monetization component 140 operable with the illustrator component 130 may share a portion of the profits with the illustrators in proportion to the number of views their models are receiving. The monetization component 140 may additionally retain a commission for payment to the illustrator through the illustration component 130.

An example of the monetization component 140 working with the illustrator component 130 to generate revenue will now be discussed, without limitation. Illustrators and other contributors may be able to view items that need models to be created via the illustrator component 130. Multiple artists can submit models for the product or requested modeling project. The requester, for example, a merchant, can select the generated model they prefer. The illustrator or other contributor that made the model that was selected may get paid according to the number of views the model receives. The monetization component 140 may retain a commission of this payment for the commercial platform 100. For example, a furniture manufacturer may post a chair that needs a model, resulting in ten models being submitted by ten respective illustrators. The furniture manufacturer may select the model submitted from the third of ten illustrators and connect the model to their website. The selected model may then be viewed by four hundred unique viewers that month and therefore pays commercial platform 100, for example, via the monetization component 140, a fee that corresponds to the four hundred views. At least part of the received fee may be in turn paid to the artist, in this example, the third illustrator. To add extra priority to an item, the furniture manufacturer could offer an additional lump sum to the artist that submitted the selected model.

In an additional example of the monetization component 140, a merchant or other requester may post items that need models to be created. The requester may also post a lump sum they will pay for the model. Illustrators and other contributors can bid on the modeling project. Illustrators and other contributors may create a portfolio of their work for requesters to see. The monetization component 140 may retain at least part of the lump sum payment as a commission for the commercial platform 100.

The commercial platform 100 may include a database 150. The database 150 may include a library of models 152, which may be created using the illustrator component 130, for example. The database may additionally be populated with information relating to products 154, for example, UPCs and merchants or e-commerce vendor. The database 150 may further include associations 156 of models with related products. The associations 156 may be made using information 154, such as UPCs with each merchant or e-commerce vendor that uses the commercial platform 100, and may include product information including three-dimensional models, item description, and other information.

In one embodiment, at least one model from the library of models may include permissions to selectively associate the model with multiple merchants. For example, the library of models may permit use between multiple merchants. The database, including the library of models, may include substantially all products and associated models, information, and other details in a common data storage location. Multiple merchants, and their respective electronic storefronts, may carry the same or similar products. These commonly carried products may be associated with at least one model in the library of modes, which may be accessed and displayed using the commercial platform offered independently via each of the merchants and/or their electronic storefronts having the proper permissions. As an example, a manufacturer may wish to promote its product for sale by merchants. This manufacturer may provide a model to the commercial platform, or contract for creation of a model through the commercial platform, which may be used by numerous merchants to sell the manufacturer's products. Multiple merchants may be provided permissions to use the shared model for each merchant's respective electronic storefront. As another example, multiple merchants may share the expense of model generation, and thus would each be permitted to access the model for their respective electronic storefronts.

The models included in the library of models 152 may come from various sources. As a first example, manufacturers may choose to provide models, for example, 3D models, and other information 154 about their products. This source of information may be provided via the merchant component 110, illustrator component 130, or otherwise provided to the commercial platform 100. As a second example, illustrators, designers, artists, and other contractors can provide models to the commercial platform 100, for example, via the illustrator component 130. If a merchant to the commercial platform 100, for example, an online store or manufacturer, would like a 3D model of a product to be made, the merchant may upload the appropriate information 154 to the illustrator component to request a modeling project. The appropriate information to request a project may include, for example, photos and measurements of the product. The appropriate information may be included in the database. Illustrators or other contractors may use the provided information to create the requested 3D models, for example, via the illustrator component 130.

Figure 2:
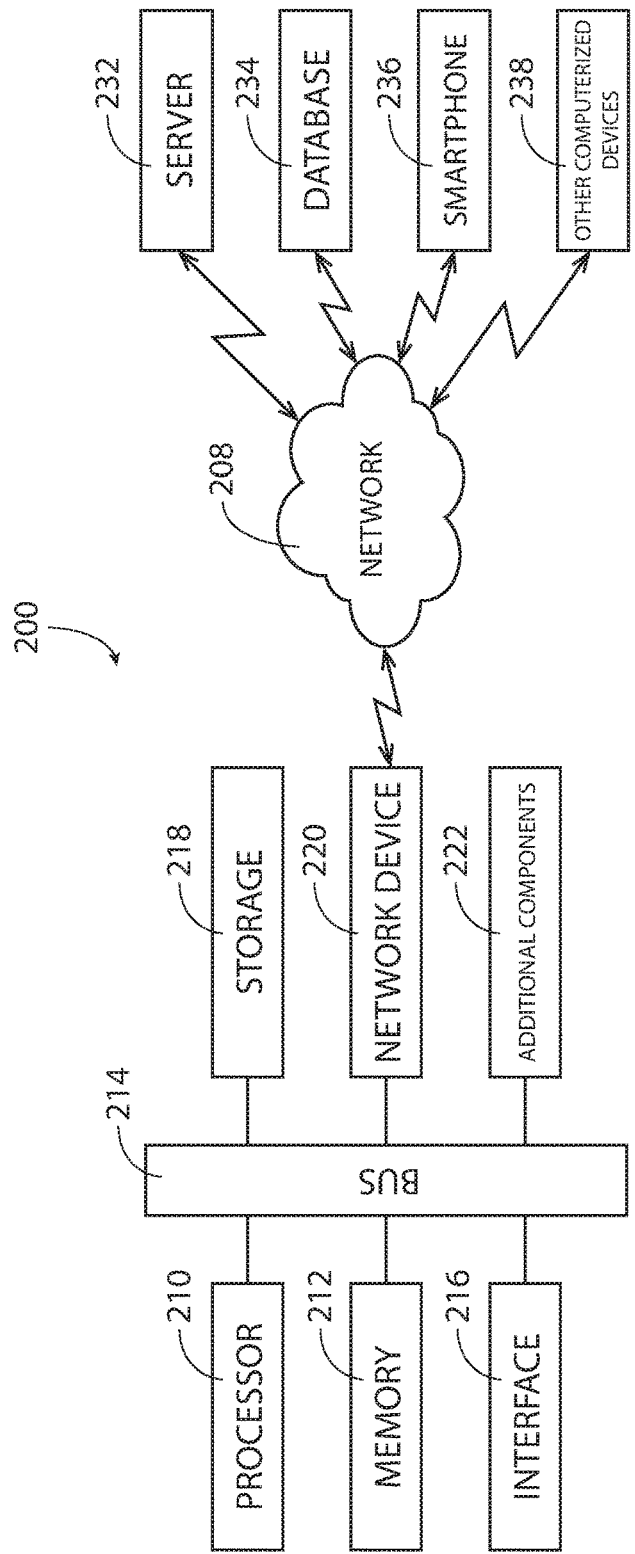
FIG. 2 is a block diagram view of an illustrative computerized device on which the system is operable, according to an embodiment of this disclosure.

Referring now to FIG. 2, an illustrative computerized device will be discussed, without limitation. Various aspects and functions described in accord with the present disclosure may be implemented as hardware or software on one or more illustrative computerized devices 200 or other computerized devices. There are many examples of illustrative computerized devices 200 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 200 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 200, among others. Additionally, aspects in accord with the present disclosure may be located on a single illustrative computerized device 200 or may be distributed among one or more illustrative computerized devices 200 connected to one or more communication networks.

For example, various aspects and functions may be distributed among one or more illustrative computerized devices 200 configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the invention is not limited to any particular distributed architecture, network, or communication protocol.

FIG. 2 shows a block diagram of an illustrative computerized device 200, in which various aspects and functions in accord with the present disclosure may be practiced. The illustrative computerized device 200 may include one or more illustrative computerized devices 200. The illustrative computerized devices 200 included by the illustrative computerized device may be interconnected by, and may exchange data through, a communication network 208. Data may be communicated via the illustrative computerized device using a wireless and/or wired network connection.

Network 208 may include any communication network through which illustrative computerized devices 200 may exchange data. To exchange data via network 208, systems and/or components of the illustrative computerized device 200 and the network 208 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 200 may transmit data via the network 208 using a variety of security measures including TSL, SSL, or VPN, among other security techniques. The illustrative computerized device 200 may include any number of illustrative computerized devices 200 and/or components, which may be networked using virtually any medium and communication protocol or combination of protocols.

Various aspects and functions in accord with the present disclosure may be implemented as specialized hardware or software executing in one or more illustrative computerized devices 200, including an illustrative computerized device 200 shown in FIG. 2. Additional examples of specialized hardware on which the system is operable include holographic headgear, head-wearable electronic devices with an at least partially transparent display, head-wearable display devices, electronic camera devices, and network attached displays, without limitation. As depicted, the illustrative computerized device 200 may include a processor 210, memory 212, a bus 214 or other internal communication system, an input/output (I/O) interface 216, a storage system 218, and/or a network communication device 220. Additional devices 222 may be selectively connected to the computerized device via the bus 214. Processor 210, which may include one or more microprocessors or other types of controllers, can perform a series of instructions that result in manipulated data. Processor 210 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 210 may be connected to other system elements, including a memory 212, by bus 214.

The illustrative computerized device 200 may also include a network communication device 220. The network communication device 220 may receive data from other components of the computerized device to be communicated with servers 232, databases 234, smart phones 236, and/or other computerized devices 238 via a network 208. The communication of data may optionally be performed wirelessly. More specifically, without limitation, the network communication device 220 may communicate and relay information from one or more components of the illustrative computerized device 200, or other devices and/or components connected to the computerized device 200, to additional connected devices 232, 234, 236, and/or 238. Connected devices are intended to include, without limitation, data servers, additional computerized devices, mobile computing devices, smart phones, tablet computers, and other electronic devices that may communicate digitally with another device. In one example, the illustrative computerized device 200 may be used as a server to analyze and communicate data between connected devices.

The illustrative computerized device 200 may communicate with one or more connected devices via a communications network 208. The computerized device 200 may communicate over the network 208 by using its network communication device 220. More specifically, the network communication device 220 of the computerized device 200 may communicate with the network communication devices or network controllers of the connected devices. The network 208 may be, for example, the internet. As another example, the network 208 may be a WLAN. However, skilled artisans will appreciate additional networks to be included within the scope of this disclosure, such as intranets, local area networks, wide area networks, peer-to-peer networks, and various other network formats. Additionally, the illustrative computerized device 200 and/or connected devices 232, 234, 236, and/or 238 may communicate over the network 208 via a wired, wireless, or other connection, without limitation.

Memory 212 may be used for storing programs and/or data during operation of the illustrative computerized device 200. Thus, memory 212 may be a relatively high performance, volatile, random access memory such as a dynamic random access memory (DRAM) or static memory (SRAM). However, memory 212 may include any device for storing data, such as a disk drive or other non-volatile storage device. Various embodiments in accord with the present disclosure can organize memory 212 into particularized and, in some cases, unique structures to perform the aspects and functions of this disclosure.

Components of illustrative computerized device 200 may be coupled by an interconnection element such as bus 214. Bus 214 may include one or more physical busses (for example, busses between components that are integrated within a same machine), but may include any communication coupling between system elements including specialized or standard computing bus technologies such as USB, Thunderbolt, SATA, FireWire, IDE, SCSI, PCI and Infini-Band. Thus, bus 214 may enable communications (for example, data and instructions) to be exchanged between system components of the illustrative computerized device 200.

The illustrative computerized device 200 also may include one or more interface devices 216 such as input devices, output devices and combination input/output devices. Interface devices 216 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 216 allow the illustrative computerized device 200 to exchange information and communicate with external entities, such as users and other systems.

Storage system 218 may include a computer readable and writeable nonvolatile storage medium in which instructions can be stored that define a program to be executed by the processor. Storage system 218 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk or flash memory, among others. In operation, processor 210 or some other controller may cause data to be read from the nonvolatile recording medium into another memory, such as the memory 212, that allows for faster access to the information by the processor than does the storage medium included in the storage system 218. The memory may be located in storage system 218 or in memory 212. Processor 210 may manipulate the data within memory 212, and then copy the data to the medium associated with the storage system 218 after processing is completed. A variety of components may manage data movement between the medium and integrated circuit memory element and does not limit the invention. Further, the invention is not limited to a particular memory system or storage system.

Although the above described illustrative computerized device is shown by way of example as one type of illustrative computerized device upon which various aspects and functions in accord with the present disclosure may be practiced, aspects of the invention are not limited to being implemented on the illustrative computerized device 200 as shown in FIG. 2. Various aspects and functions in accord with the present disclosure may be practiced on one or more computers having a different architectures or components than that shown in FIG. 2. For instance, the illustrative computerized device 200 may include specially-programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, iOS, MAC OS X, or other operating systems on the aforementioned processors and/or specialized computing devices running proprietary hardware and operating systems.

The illustrative computerized device 200 may include an operating system that manages at least a portion of the hardware elements included in illustrative computerized device 200. A processor or controller, such as processor 210, may execute an operating system which may be, among others, an operating system, one of the above mentioned operating systems, one of many Linux-based operating system distributions, a UNIX operating system, or another operating system that would be apparent to skilled artisans. Many other operating systems may be used, and embodiments are not limited to any particular operating system.

The processor and operating system may together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C#, Python, PHP, Visual Basic .NET, JavaScript, Perl, Ruby, Delphi/Object Pascal, Visual Basic, Objective-C, Swift, MATLAB, PL/SQL, OpenEdge ABL, R, Fortran or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-programmed environment (for example, documents created in HTML5, HTML, XML, CSS, JavaScript, or other format that, when viewed in a window of a browser program, render aspects of a graphical-user interface or perform other functions). Further, various embodiments in accord with the present disclosure may be implemented as programmed or non-programmed elements, or any combination thereof. For example, a web page may be implemented using HTML while a data object called from within the web page may be written in C++. Thus, the invention is not limited to a specific programming language and any suitable programming language could also be used.

An illustrative computerized device included within an embodiment may perform functions outside the scope of the invention. For instance, aspects of the system may be implemented using an existing commercial product, such as, for example, Database Management Systems such as SQL Server available from Microsoft of Redmond, Wash., Oracle Database or MySQL from Oracle of Redwood City, Calif., or integration software such as WebSphere middleware from IBM of Armonk, N.Y.

Figure 3:
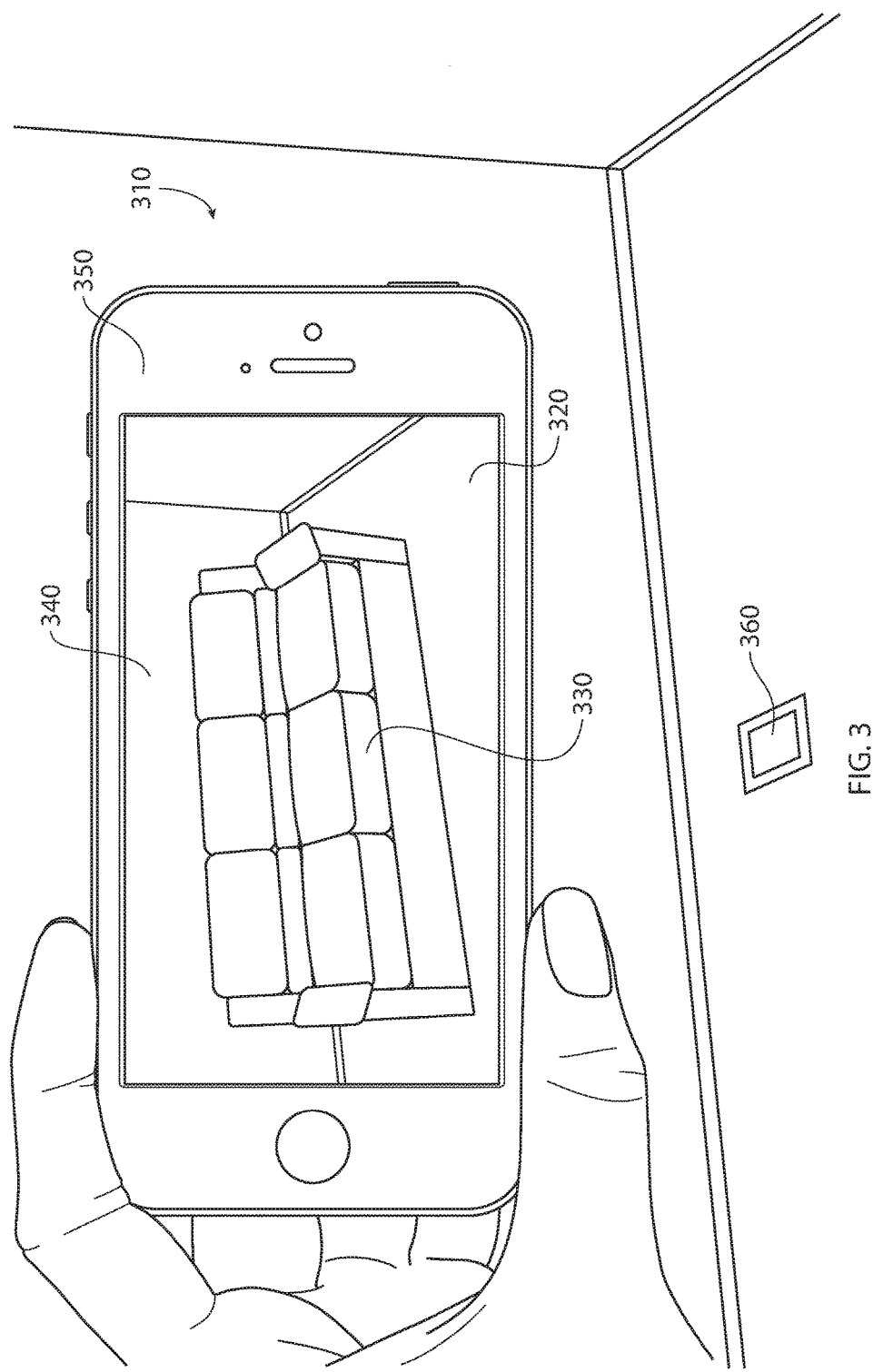
FIG. 3 is a perspective view of an environment viewed via a consumer component, according to an embodiment of this disclosure.

Referring now to FIGS. 1-3, the consumer component and augmentation engine will be discussed in greater detail. The consumer component 120 may be operable on a computerized device for example, the computerized device 200 described above, which may be a mobile device, without limitation. Diagram 310 of FIG. 3 provides an example of the commercial platform 100 being used as an application or website 320 on a computerized device 350, such as a smartphone, without limitation. This example depicted in diagram 310 is provided with the interest of clearly illustrating one possible embodiment of this description and is not intended to limit the rest of the description in any way.

In the following example shown in diagram 310, an embodiment of the commercial platform 100 includes the consumer component 120 being operated as a website, application, or other interface 320 usable on a computerized device 350, such as a smartphone or other portable device. Through the interface 320, a three-dimensional model 330 or hologram of a product may be viewed. For example, a consumer may find a product that has an available model that he or she would like to view augmented in a substantially live representation of an environment 340. The consumer may select a button or other element to indicate the product for augmentation. Augmentation of the model 330 may be provided by an augmentation engine 122, which may be operated as an integrated part of the consumer component 120 and/or an external engine communicably connected to the consumer component 120, without limitation.

A model 330 of the selected product may be augmented in a substantially live representation of the environment 340 using a target 360 as a reference point. If a consumer does not have a target 360, then the consumer may be prompted to print or otherwise create a target 360. A target 360 may be a piece of paper that has an image on it that the augmentation engine 122 may recognize as a location in a space. A target 360 may work for virtually any item, and may not need to be an individual image to correspond with each item.

When the camera of the mobile device 350 can view the target 360, a model 330 corresponding with an item may appear on the screen of the mobile device 350 as if it were actually present in the substantially live representation of the environment 340. The computer may use the dimensions, angle, and/or size of the target in view of the camera as a reference point to place the model 330 of the item at the correct angle and perspective in the substantially live representation of the environment 340.

Photographing the environment may not be necessary using the augmentation engine 122. A substantially live view of the real environment may be displayed on the screen and the model 330 may be correctly oriented on the screen in substantially real-time by assessing the size (distance) and skew (angle) of the target 360.

Barcodes and catalogues may not be necessary to select a model using the commercial platform 100 of this disclosure. The commercial platform 100 may determine which model 330 to display through user input. For example, if a user is looking at the item page of a couch on a website and clicks on a button, for example, a "Hologram" button, then the model of that same couch may be displayed. Additionally, the user can then search other items with models. Multiple models may be queued for viewing later.

In an embodiment of this disclosure, the commercial platform 100 does not create a 3D environment as provided with Virtual Reality. Rather, the commercial platform may create a virtual object or series of objects that can be oriented on the substantially live screen of an electronic device 350 as if the objects were part of the real world using augmented reality (AR). Additionally, in an embodiment of this disclosure, the commercial platform 100 does not create a 3D model of the object. Rather, it uses a model that is stored in the library of models 152 or one that is provided from the e-commerce store or other source.

With the commercial platform 100 of this disclosure, a user may advantageously not need to input any information about the length/width/height of an environment or the length/width/height of a 3D model. Rather, the target may be used to compute the orientation and size of the model. The target can be a predetermined image that the device is preset to find. Alternatively, the target may be variable or definable for an intended application. For example, commercial platform 100 may also allow the user to create a target by photographing a flat reference object with non-symmetric details, like a book cover, with a credit-card-sized object, driver's license, dollar bill, or other object with known dimensions in view, so the commercial platform 100 can determine the size of the newly defined target. In one embodiment, the reference object may be substantially symmetrical on an axis. Generally, besides the target, and any corresponding reference object to define the target, no other features of the room need to be detected.

In operation, the commercial platform may be used to facilitate a shopping experience for a consumer and increase the likelihood of completing a commercial transaction. Using the commercial platform, a merchant may advantageously list one or more of their products to be accessed by a consumer, virtualized in an environment by the consumer, and purchased by a consumer. The merchant may advantageously use the commercial platform of this disclosure to facilitate a commercial transaction while beneficially minimizing returns and associated shipping and/or freight fees. Those of skill in the art will appreciate that the following methods are provided to illustrate an embodiment of the invention, and should not be viewed as limiting the invention to only those methods or aspects. Skilled artisans will appreciate additional methods within the scope and spirit of the disclosure for performing the operations provided by the examples below after having the benefit of this disclosure. Such additional methods are intended to be included by this disclosure.

Figure 4:
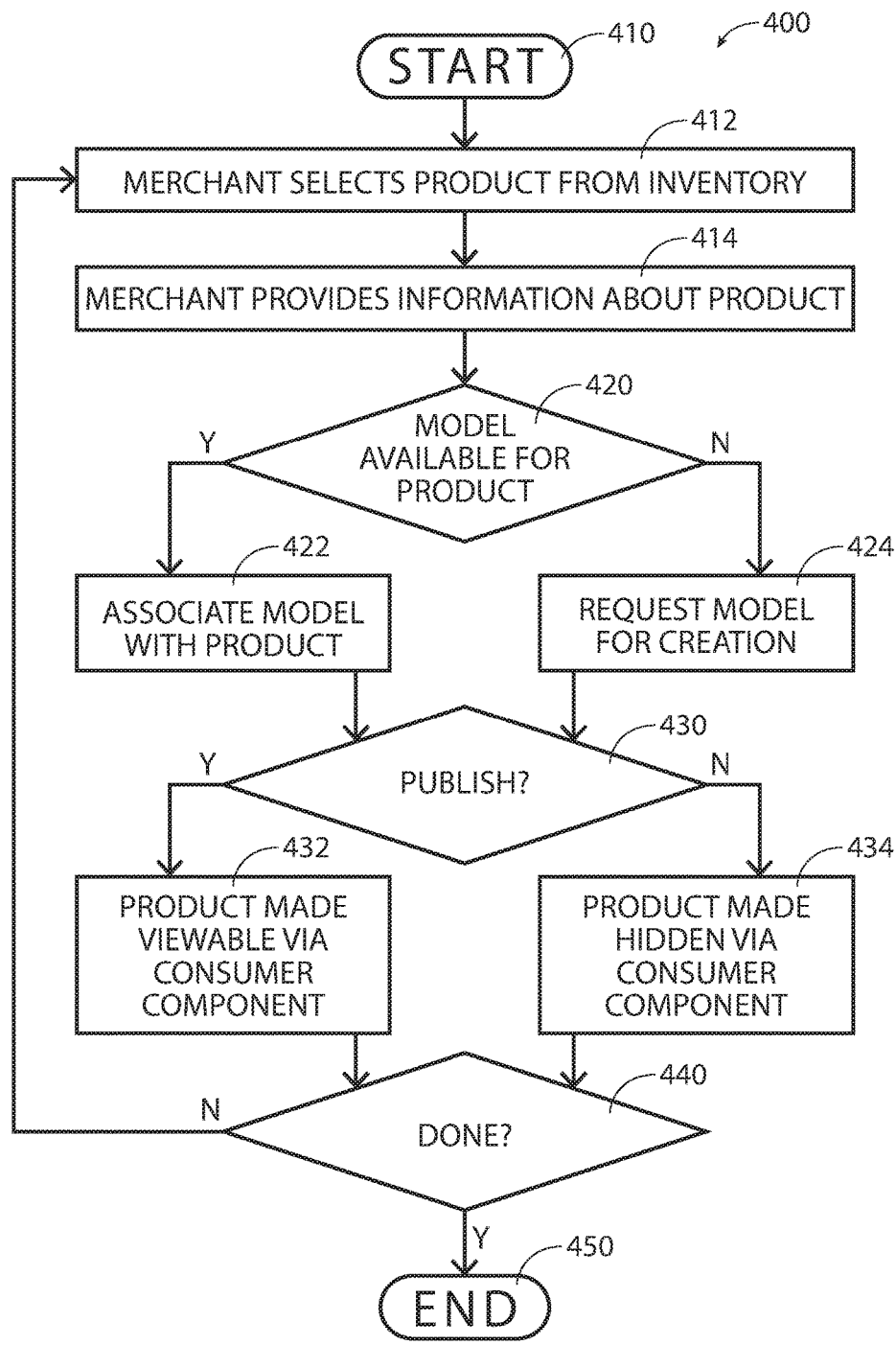
FIG. 4 is a flow chart view of an illustrative operation of a merchant component, according to an embodiment of this disclosure.

Referring to flowchart 400 of FIG. 4, an illustrative operation of a merchant component will now be described, according to an embodiment of this disclosure. Starting at block 410, a merchant may select one or more products associated with information from an inventory using the commercial platform (block 412). At this step, the merchant may identify one or more products to list using the commercial platform, which may include selecting an existing product from a merchant inventory, defining a product, and/or otherwise indicating a product to use with the commercial platform. The merchant may additionally provide information about the product, including the size of a product, dimensions, colors, patterns, UPC, SKU code, weight, shipping facility, shipping destinations, inventory, expected restocking dates, and other information that would be apparent to a person of skill in the art after having the benefit of this disclosure (block 414).

Using the merchant component of the commercial platform, it may be determined whether a model is available for a product (block 420). If it is determined at block 420 that a model is available for the product, the model may be associated with that product (block 422). Conversely, if it is determined at block 420 that a model is not available for the product, a request for model creation may be made, for example, via the illustrator component (block 424).

After the operations of block 422 and/or block 424, it may be determined whether the product should be published for sale using the commercial platform (block 430). If it is determined at block 430 that the product should be published, the product may be made available to consumers and/or other parties via additional components of the system, for example, the consumer component (block 432). Conversely, if it is determined at block 430 that the product should not be published, the product may be hidden from other components of the system, or alternatively, hidden from consumers accessing the system using other components of the system (block 434).

After the operations of block 432 and/or block 434 have been performed, this illustrative operation of the merchant component may determine whether interaction with the merchant component, for example by the merchant, has concluded or whether any additional products should be defined (block 440). If it is determined at block 440 that additional products should be defined, the operation may return to block 412 for definition of the additional products. Conversely, if it is determined at block 440 that the operation may conclude, the operation will terminate at block 450.

Figure 5:
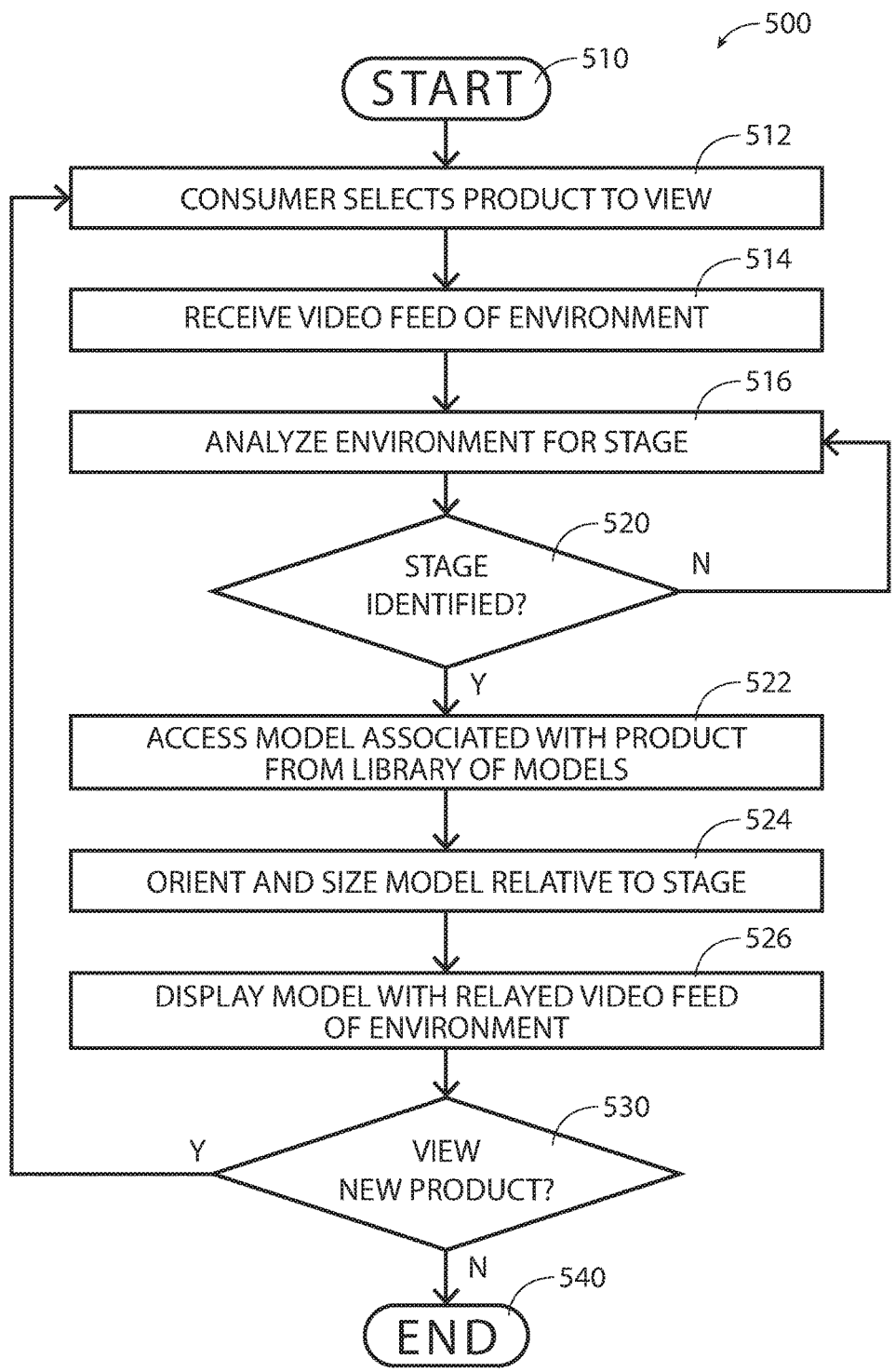
FIG. 5 is a flow chart view of an illustrative operation for viewing a product via a consumer component, according to an embodiment of this disclosure.

Referring to flowchart 500 of FIG. 5, an illustrative operation of viewing a product using a consumer component will now be described, according to an embodiment of this disclosure. Starting at block 510, a consumer or other user may select a product to view using the consumer component of the commercial platform (block 512). The commercial platform may then receive a video feed of the environment (block 514). The video feed may be received from a camera included by the computerized device on which the consumer component of the commercial platform is operated, for example.

The consumer component may analyze the video feed for the presence of a target (block 516). From the analysis of block 516, the consumer component may determine whether a target has been identified (block 520). If it is determined at block 520 that no target has been identified in the environment, the operation may return to block 516 and continue to analyze the video feed. Conversely, if it is determined at block 520 that a target is identified in the environment, the consumer component may access a model associated with a product identified by the user from a library of models (block 522). As discussed above, the library of models may be included in the database.

After the consumer component has accessed the model associated with the product at block 522, the consumer component may orient and size the model relative to the target (block 524). In one example, the model may be oriented relative to dimensions of the detected target, using the target as a reference point at which to render the model. The size of the target may be known by the consumer component or other components of the commercial platform. Alternatively, the size of the target may be determined relative to a known object, such as a credit card or letter-sized sheet of paper, or other object located in the environment.

Once the model has been oriented and sized relative to the target at block 524, the model may be displayed using the consumer component with the relayed video feed of the environment (block 526). The video feed may be substantially live, and thus may provide a substantially live representation of the environment. The model of the product may be rendered with the substantially live representation of the environment, as provided by the relayed video feed, such that a simulated product may appear to exist within the environment through the consumer component of the commercial platform. The model and/or substantially live representation of the environment may be provided to a user, for example, via a display connected to or included by the computerized device on which the consumer component is operated.

After the consumer or other user has finished viewing the model augmented with the substantially live representation of the environment provided by block 526, the consumer or other user may determine whether he or she wishes to view an additional product (block 530). If the consumer or other user decides at block 530 to view an additional product, the operation may return to block 512, allowing another product to be selected for viewing. Conversely, if it is determined at block 530 that the consumer or other user does not wish to view a new product, the operation may terminate at block 540.

Figure 6:
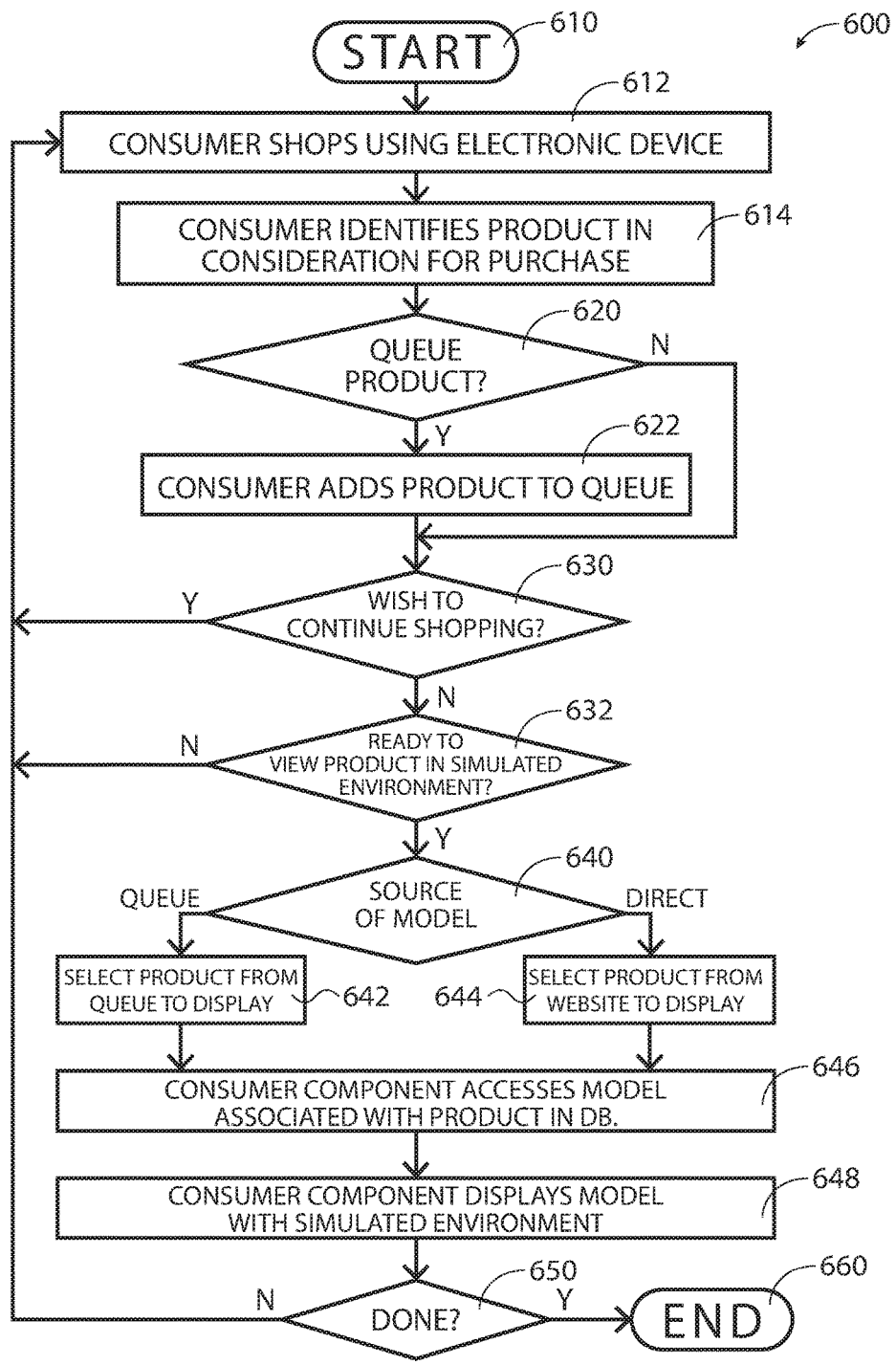
FIG. 6 is a flow chart view of an illustrative operation of interacting with a consumer component, according to an embodiment of this disclosure.

Referring to flowchart 600 of FIG. 6, an illustrative operation of interacting with a consumer component will now be described, according to an embodiment of this disclosure. Starting at block 610, the consumer may shop using an electronic device, for example, on a commercial website, app, and/or other electronic marketplace (block 612). The consumer may identify a product that he or she contemplates purchasing (block 614). The identified product may be added to a list at block 620, for example a shopping cart, wish list, augmentation list, or other list that will be appreciated by skilled artisans after having the benefit of this disclosure. If the consumer chooses to queue the product for viewing at block 620, for example, in a list, the product may be added to the queue (block 622).

After deciding to queue a product at block 620, 622 or deciding not to queue at block 620, the consumer may determine whether he or she wishes to continue shopping before viewing a selected product using the consumer component of the commercial platform (block 630). If the consumer wishes to continue shopping at block 630, the consumer may be returned to the operation of block 612 to continue shopping. In one embodiment, any additional items may be optionally added to a queue or list by the consumer. If the consumer does not wish to continue shopping at block 630, the consumer may determine if he or she is ready to view the selected and/or queued products simulated in a substantially live representation of the environment (block 632).

If at block 632 the consumer is not ready to view the products in the simulated environment, the consumer may be returned to the commercial website or other electronic marketplace, as described in block 612. Conversely, if at block 632 the consumer is ready to view the product simulated in the environment, the consumer may be directed to the operation of block 640, where he or she will select the source of the model to first augment in a substantially live representation of the environment. For example, the user may select at block 640 whether he or she wishes to view a product from the queue or a product directly selected from the commercial website.

If the consumer selects at block 640 to view a product from the queue, the consumer may select the product from the queue which he or she wishes to initially view (block 642). Conversely, if the consumer selects at block 640 to view a product directly from a commercial or other website, the consumer may engage that website or other source to indicate the product to display (block 644). After selecting the product in blocks 642 and/or 644, the consumer component may access a model associated with the product from the library of models, which may be included in a database (block 646). The database may be communicatively connected to the consumer component of the commercial platform, for example, via a network. The consumer component may then display the model with a simulated environment, for example, a substantially live video feed of the environment (block 648). The operation of blocks 630-648 may be repeated for viewing of additional products in the simulated environment. In some embodiments, the operation illustrated by flowchart 600 may allow user to jump substantially immediately to the queue after starting, without limitation.

The operation may then determine whether the consumer wishes to additionally engage the consumer component at block 650. If it is determined at block 650 that additional engagement is desired by the consumer, the operation may continue to operate, for example, by returning to the commercial website as provided in block 612. Conversely, if it is determined at block 650 that the consumer is done engaging with the commercial platform, the operation may terminate at block 660.

Figure 7:
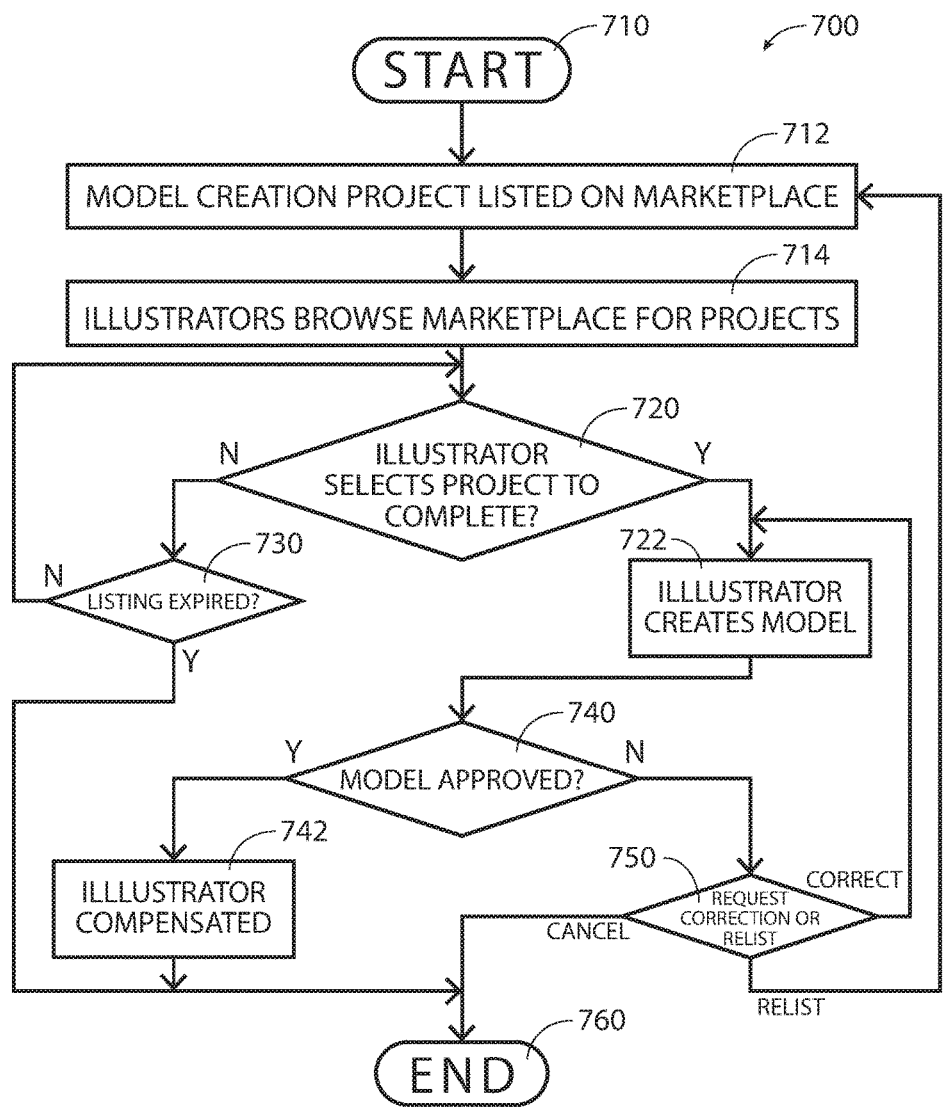
FIG. 7 is a flow chart view of an illustrative operation of an illustrator component, according to an embodiment of this disclosure.

Referring to flowchart 700 of FIG. 7, an illustrative operation of an illustrator component will now be described, according to an embodiment of this disclosure. The illustrator component may facilitate communication between merchants and illustrators to create the models included by the library of models and usable with the other components of the commercial platform. As discussed above, a model may include a three-dimensional representation of a product, two-dimensional art, a spec-sheet, and/or other simulated representation of a product. Starting at block 710, a model creation project may be listed on the illustrator marketplace or other aspect of the illustrator component (block 712). Illustrators may browse the marketplace for projects to complete (block 714). The project may optionally be listed with an expiration, allowing only a limited time for illustrators to select and/or complete the modeling project.

The illustrator component may determine if an illustrator has selected a project for completion (block 720). If it is determined at block 720 that no illustrator has selected a project for completion, the listing may be analyzed to determine whether it has expired (block 730). If the project has not expired, or alternatively does not have an expiration, the illustrator component may continue to list the project and monitor whether the project has been selected, as provided at block 720. Conversely, if it is determined at block 730 that the project has expired, the operation relating to the modeling project may terminate at block 760, which may include removing the project from the marketplace.

If it is determined at block 720 that an illustrator selected a project for completion, the illustrator component may assign the project to the selecting illustrator. Some projects may be assigned to multiple illustrators for delegation, competition, or other purposes. The illustrator may then create the model (block 722).

Upon being created by the illustrator at block 722, the model may be submitted for approval by the requesting merchant, an administrator, or another party (block 740). In one embodiment, the model may be approved by a contractor of the project, for example, a merchant or manufacturer. In another embodiment, the model may be approved by an intermediate third party, for example, an operator of the commercial platform. Third party approval may be performed in an individual capacity and/or on behalf of a merchant, manufacturer, or other party. Skilled artisans will appreciate additional approval processes to ensure quality of modeling projects after having the benefit of this disclosure. Optionally, a modeling project may be exempted from an approval process.

If it is determined at block 740 that the model is approved, the illustrator may be compensated for his or her work (block 742). The operation may terminate after illustrator compensation. Conversely, if it is determined at block 740 that the model is not approved, the party or operation responsible for granting approval may determine wither to request a correction to the proposed model created for the project or relist the project for other illustrators (block 750). If it is determined at block 750 that correction to the submitted model will be requested, the operation may return to block 722 for the illustrator to continue creating the model. Conversely, if it is determined at block 750 that the project should be relisted, the operation may return to block 712 for relisting on the marketplace. Optionally, cancellation of the project may be permitted at block 750, after which the operation may terminate at block 760.

In an additional embodiment, merchants may purchase and/or license previously generated models. These previously generated models may have been created, for example, through previous modeling projects. In this example, an illustrator may sell or license access to a model previously created for other jobs, advantageously extending the revenue stream while reducing the need for unnecessarily duplicated work. As another example, the previously generated models may be created by a manufacturer and provided to merchants and other parties to use through the commercial platform to promote the manufacturer's products. Skilled artisans will appreciate additional examples of models being created prior to purchase or lease after having the benefit of this disclosure.

In an additional embodiment, the model may be provided as a two-dimensional picture or sprite displayed with the substantially live representation of the environment. In an additional embodiment, the substantially live representation of the environment may be provided at least in part via displays with some degree of transparency, which may be included with tablets, phone, headwear, glasses, goggles, or other display-enabled devices.

In an additional embodiment, the augmentation engine may operate using a video feed that is relayed from multiple video sources, for example, multiple cameras. The video feed from the multiple video inputs created using cameras may be analyzed to determine a depth factor. The depth factor may be approximated relative the multiple video inputs. The depth factor may be used to approximate a three-dimensional space.

While various aspects of the invention have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A commercial platform comprising:
   a database accessible via a computerized device with a processor and memory, the database comprising (i) a library of product models wherein one or more three-dimensional product models within the library of product models comprise a three-dimensional image that approximates a corresponding physical product for virtual rendering of the physical product augmented in the environment in which the product may be located or installed, (ii) information relating to products, (iii) and an association of a three-dimensional product model from the library of product models with at least one of the products, wherein the database comprising the library of product models is configured to permit multiple merchants to access the same three-dimensional product model within the same database;
   a merchant component to define the information and define the association of the at least one of the products with the three-dimensional product model;
   a consumer component operable on the computerized device through which the three-dimensional product model is selectable to augment within a substantially live representation of an environment, wherein the three-dimensional product model is selected by indicating the at least one of the products associated with the three-dimensional product model, wherein the three-dimensional product model is accessed from the database to be augmented within the substantially live representation of the environment relative to a target located in the environment;
   an illustrator component to facilitate interaction between merchants and illustrators, wherein a product model contributor can create an account via the illustrator component and submit one or more three-dimensional product models to be included in the library of product models in the same database;
   a monetization component to charge a compensation for the commercial platform; wherein the monetization component charges the compensation for the commercial platform relative to interaction with the illustrator component, the merchant component, or the consumer component and wherein the compensation for the commercial platform is charged using a commission model to charge the compensation retained by the commercial platform based on completed sales;
   wherein at least one three-dimensional product model from the library of product models comprises permissions to selectively associate the at least one three-dimensional product model with multiple merchants, wherein the library of product models is configured to permit shared use between multiple merchants of three-dimensional product models for commonly carried products;
   wherein the consumer component comprises an augmentation engine to detect the target and display the three-dimensional product model associated with the at least one of the products that is selected as being augmented in the substantially live representation of the environment relative to the target, the three-dimensional product model being displayed with a size being determined relative to dimensions of the target;
   wherein the target provides a reference point to augment the three-dimensional product model with the substantially live representation of the environment;
   wherein at least one three-dimensional product model submitted via the illustrator component and included in the library of product models comprises permissions to selectively associate the at least one three-dimensional product model submitted via the illustrator component with multiple merchants to permit shared use between multiple merchants, wherein the at least one three-dimensional product model submitted via the illustrator component is capable of being displayed and augmented by the augmentation engine in the substantially live representation of the environment relative to the target; and
   wherein at least a portion of said components comprise one or more of hardware circuits, programmable hardware devices, and executable code, the executable code stored on one or more computer readable storage media.

2. The commercial platform of claim 1, wherein the illustrator component facilitates contracting of illustrators for generation of at least one product model includable in the library of product models and includes a filter to facilitate sorting through available projects and selecting a project that an illustrator wishes to complete.

3. The commercial platform of claim 2, wherein the illustrator component permits a merchant to request a modeling project, wherein the modeling project can be assigned to multiple illustrators for competition and wherein the modelling project permits multiple illustrators to submit a product model in response to the modeling project, wherein one or more product models submitted via the illustrator component can be selected for use by the merchant component; and wherein the monetization component charges a compensation for an illustrator relative to selection of a product model submitted via the illustrator component, and wherein the monetization component retains a commission for payment to the illustrator through the illustrator component.

4. The commercial platform of claim 1, wherein the substantially live representation of the environment comprises an at least partially transparent display through which at least part of the environment is viewable.

5. The commercial platform of claim 1, wherein the substantially live representation of the environment comprises a video feed.

6. The commercial platform of claim 5, wherein the video feed is created using a camera and wherein the video feed is relayed to a display.

7. The commercial platform of claim 5, wherein the video feed comprises multiple video inputs created using cameras, wherein a depth factor is approximated relative to the multiple video inputs, and wherein the depth factor is used to approximate a three-dimensional space.

8. The commercial platform of claim 1, wherein the products are selected via the consumer component to create a queue of product models to be selectively displayed with the substantially live representation of the environment.

9. The commercial platform of claim 1, wherein the consumer component is operable via an application program interface.

10. The commercial platform of claim 1, wherein the merchant component is manipulable via a merchant desiring to sell the at least one of the products and wherein the consumer component is manipulable via a consumer considering to purchase the at least one of the products being sold by the merchant.

11. A commercial platform comprising:
a database accessible via a computerized device with a processor and memory, the database comprising (i) a library of product models wherein one or more three-dimensional product models within the library of product models comprise a three-dimensional image that approximates a corresponding physical product for virtual rendering of the physical product augmented in the environment in which the product may be located or installed, (ii) information relating to products, (iii) and an association of a three-dimensional product model from the library of product models with at least one of the products wherein the database comprising the library of product models is configured to permit multiple merchants to access the same three-dimensional product model within the same database;
a merchant component to define the information and define the association;
a consumer component operable on the computerized device to select the three-dimensional product model to augment with a substantially live representation of an environment, wherein the three-dimensional product model is selected by indicating the at least one of the products associated with the three-dimensional product model, wherein the three-dimensional product model is accessed from the database to be augmented within the substantially live representation of the environment;
an illustrator component to facilitate interaction between merchants and illustrators, wherein an illustrator can create an account via the illustrator component and submit one or more three-dimensional product models to be included in the library of product models in the same database, and wherein the illustrator component facilitates contracting of illustrators for generation of at least one three-dimensional product model includable in the library of product models;
a monetization component to charge a compensation from the commercial platform; wherein the monetization component charges the compensation relative to interaction with the merchant component and the consumer component, and wherein the monetization component retains a commission wherein the compensation is charged using a commission model to charge the commission retained by the monetization component based on completed sales;
wherein at least a portion of said components comprise one or more of hardware circuits, programmable hardware devices, and executable code, the executable code stored on one or more computer readable storage media;
wherein the library of product models is configured to permit shared use between multiple merchants of three-dimensional product models for commonly carried products; and
wherein the substantially live representation of the environment comprises a video feed created using a camera and relayed to a display.

12. The commercial platform of claim 11:
wherein the three-dimensional product model is augmented with the substantially live representation of the environment relative to a target located in the environment;
wherein the target provides a reference point to augment the three-dimensional product model with the substantially live representation of the environment; and
wherein the consumer component further comprises an augmentation engine to detect the target and display the three-dimensional product model of the product augmented in the substantially live representation of the environment relative to the target.

13. The commercial platform of claim 11, wherein the monetization component charges a compensation for an illustrator relative to submission of a product model via the illustrator component, wherein the monetization component retains a commission for payment to the illustrator through the illustrator component.

14. The commercial platform of claim 11, wherein the video feed comprises multiple video inputs created using cameras, wherein a depth factor is approximated relative to the multiple video inputs used to approximate a three-dimensional space.

15. The commercial platform of claim 11, wherein the products are selected via the consumer component to create a queue of product models to be selectively displayed with the substantially live representation of the environment.

16. The commercial platform of claim 11, wherein the consumer component is operable via an application program interface to be at least partially integrated into a commercial website.

17. A method of conducting commerce by a commercial platform operable using a computerized device with a processor and memory, the method comprising the steps:
(a) accessing a database by the computerized device, the database comprising (i) a library of product models wherein one or more three-dimensional product models within the library of product models comprise a three-dimensional image that approximates a corresponding physical product for virtual rendering of the physical product augmented in the environment in which the product may be located or installed, wherein the database is configured to permit multiple merchants to access the library of product models in the same database, and wherein the library of product models is configured to permit shared use of three-dimensional product models between multiple merchants for commonly carried products, (ii) information relating to products, (iii) and an association of a three-dimensional product model from the library of product models with at least one of the products;

(b) defining the information by a merchant component;

(c) defining the association of the at least one of the products with the three-dimensional product model by the merchant component;

(d) selecting the three-dimensional product model to augment with a substantially live representation of an environment by a consumer component operable on the computerized device, wherein the consumer component performs the steps:
  (i) receiving an indication of the at least one of the products associated with the three-dimensional product model,
  (ii) accessing the three-dimensional product model from the database,
  (iii) locating a target in the environment, and
  (iv) augmenting the three-dimensional product model with the substantially live representation of the environment relative to the target;

(e) contracting at least one illustrator by an illustrator component to generate at least one three-dimensional product model includable in the library of product models;

(f) charging a compensation for the commercial platform by a monetization component, wherein a commission is retained for the commercial platform;

wherein the consumer component comprises an augmentation engine detecting the target and displaying the three-dimensional product model associated with the at least one of the products that is selected, the three-dimensional product model being displayed with a size being determined relative to dimensions of the target;

wherein the target provides a reference point to augment the three-dimensional product model with the substantially live representation of the environment;

wherein the merchant component is manipulable via a merchant desiring to sell the at least one of the products and wherein the consumer component is manipulable by a consumer considering to purchase the at least one of the products being sold by the merchant; and wherein at least a portion of said components comprise one or more of hardware circuits, programmable hardware devices, and executable code, the executable code stored on one or more computer readable storage media.

18. The method of claim 17, further comprising the step:
  (g) charging a compensation for an illustrator via the monetization component, wherein the compensation is retained for the illustrator relative to a product model submitted by the illustrator via the illustrator component and includable in the library of product models.

19. The method of claim 18, wherein the compensation is a commission charged based on a number of views by consumers of a submitted product model.

* * * * *